2,782,127

PLASTICIZED CELLULOSE COMPOUND AND A SHEET MADE THEREFROM

Eric Eaton Walker, Wilfred Rogerson Foggon, Ronald Stanley Locke, and Michael Pearman Shaw, Spondon, near Derby, England, assignors to British Celanese Limited, a corporation of Great Britain No Drawing. Application February 13, 1953, Serial No. 336,878

Claims priority, application Great Britain February 22, 1952

14 Claims. (Cl. 106—177)

The object of this invention is thermoplastic compositions containing halogenated plasticisers and color stabilizer and a transparent sheet made therefrom.

Certain compounds containing halogen are very useful plasticisers for cellulose acetate and other cellulose esters or cellulose ethers in the compounding of thermoplastic compositions from such esters or ethers in that they enable compositions to be produced which burn with difficulty or not at all. Tri(beta-chlorethyl)phosphate, hereinafter referred to as trichlorethyl phosphate, is an example of such a plasticiser and is particularly useful since it has a very high solvent power for cellulose acetate. It possesses the disadvantage that it tends to liberate hydrochloric acid when heated and/or exposed to light and this liberated hydrochloric acid may have a destructive effect on cellulose acetate or other constituents of compositions containing it, for example colouring matters.

Thus 1-amino-4-hydroxy-anthraquinone and other amino-anthraquinones are useful colouring matters for cellulose acetate plastics in that they colour it in bright shades of very good fastness to light under normal conditions. In the presence of trichlorethyl phosphate, however, many of these, particularly 1-amino-4-hydroxy-anthraquinone, are quickly faded under the influence of heat and/or light.

We have found that in compositions containing trichlorethyl phosphate and particularly in compositions comprising cellulose acetate plasticised with this substance, the deleterious effects normally experienced due to decomposition of the trichlorethyl phosphate can be largely or substantially wholly avoided by including alkali metal salts of organic carboxylic acids in the composition. The alkali metal salts of phthalic acid, preferably the di-alkali metal salts and particularly disodium phthalate, are very effective for this purpose. Thus a 0.01″ film of cellulose acetate plasticised with about 30% of its weight of trichlorethyl phosphate and coloured in a rose shade with 1-amino-4-hydroxy-anthraquinone is more or less completely faded after 100 hours exposure in a carbon-arc fadeometer of the kind normally used for testing light fastness of dyeings on textile materials. The inclusion in the film of a small proportion of disodium phthalate, for example about 1% based on the weight of the trichlorethyl phosphate, results in a film which is practically unfaded after the same period of exposure.

The present invention comprises in particular a composition of matter containing trichlorethyl phosphate together with an alkali metal salt of phthalic acid. Such a composition may have colouring matters incorporated therein and the resulting colour be of good resistance to heat and/or light even when the colouring matter is one which would be seriously damaged in the absence of the alkali metal salt. The invention especially contemplates thermoplastic compositions comprising cellulose acetate plasticised with trichlorethyl phosphate, with or without other plasticisers or softeners, together with an alkali metal salt of phthalic acid and particularly disodium phthalate. The compositions may contain colouring matters, the presence of the alkali metal phthalate being especially beneficial when the colouring matter is one which, like 1-amino-4-hydroxy-anthraquinone, is deleteriously affected by the action of heat and/or light in the presence of trichlorethyl phosphate. On the other hand, the compositions may be free from colouring matters, for example, compositions in the form of, or suitable for conversion into uncoloured transparent sheets.

The proportion of alkali metal phthalate may be quite small. For example disodium phthalate may be used in an amount of from 0.1 to 1% based on the weight of the whole composition or 0.3 to 3% based on the weight of the trichlorethyl phosphate. Proportions down to 0.03% based on the weight of the whole composition or down to 0.1% or even 0.05% based on the weight of the trichlorethyl phosphate are also effective while little advantage is gained by exceeding 0.5% or 1% on the weight of the trichlorethyl phosphate. In the case of compositions comprising cellulose acetate together with 20 to 40% of its weight of trichlorethyl phosphate, the compositions are very satisfactory indeed when the content of disodium phthalate is from 0.2 to 1%, for example 0.25%, based on the weight of the trichlorethyl phosphate.

In the case of other alkali metal phthalates, for example dipotassium phthalate, good results can be obtained using the same proportions as indicated above for disodium phthalate. It is preferred however, when using such other alkali-metal phthalates, that the proportions should be such that their alkali metal contents are chemically equivalent to the sodium contents of the proportions of disodium phthalate recommended above. 0.1 part of disodium phthalate contains 0.022 part of sodium and 3 parts contain 0.66 part of sodium.

As already indicated, it is a great advantage of the compositions of the invention that they may be coloured with colouring matters which do not normally resist the action of heat and/or light in the presence of trichlorethyl phosphate. Examples of such sensitive but otherwise useful colouring matters are 1-amino-4-hydroxy-anthraquinone, 1:4-diamino-anthraquinone, 1-ethanol-amino-anthraquinone, Rhodamine 6G (colour index No. 752), and the azo dye from diazotised p-nitroaniline and N-di-(beta-hydroxyethyl)-m chloraniline. Moreover the alkali metal phthalate has no deleterious effect upon an alkali sensitive dye such as Disulphine Blue A (colour index No. 714).

The trichlorethyl phosphate may be used, if desired, in conjunction with other plasticisers or softening agents, particularly such as tend to reduce the inflammability of compositions containing them. Examples of such other plasticisers or softeners are triphenyl phosphate and tricresyl phosphate and other phosphate plasticisers. A very useful transparent composition is composed of cellulose acetate plasticised with about 30% of trichlorethyl phosphate and about 10% of triphenyl phosphate based on the weight of the cellulose acetate, the composition containing 0.2 to 1% of disodium phthalate based on the weight of the trichlorethyl phosphate. By inclusion of colouring matters such at 1-amino-4-hydroxy-anthraquinone products are obtained which, in sheet form, are very useful as colour filters for stage illumination and the like. Even when exposed to the heat and light from the lamp in conjunction with which they are used they remain substantially unfaded after long periods of use.

The compositions of the invention may be prepared in any convenient way, for example in any of the ways known from the preparation of plasticised cellulose acetate products. Thus the alkali metal phthalate may be dispersed in a solution of cellulose acetate and trichlorethyl phosphate, with or without other ingredients, in a common solvent such as acetone and the solution converted into foils or films in the ordinary way. Again solid compositions may be obtained without the aid of such substantial proportions of volatile liquid as are required to form a solution which can be cast into foils or films. For instance cellulose acetate may be intimately mixed with a small proportion of volatile solvent, e. g. acetone, and with the trichlorethyl phosphate, with or without other plasticisers, and the dough then worked on heated rolls until the major proportion of solvent has evaporated and a homogeneous product is obtained. This product may, if desired, be rolled or extruded directly into films, or better it may be formed into a block under heat and pressure and cut into sheets in the manner commonly adopted in the art of making sheets of plasticised cellulose acetate. The alkali metal phthalate and any colouring matters employed may be incorporated at any convenient stage of the operation. Thus they may be mixed with the cellulose acetate and plasticiser in the first instance or added to the composition while it is undergoing hot rolling.

The invention is illustrated by the following example the parts referred to being parts by weight:

*Example*

100 parts of cellulose acetate flake is mixed in a suitable mixing machine with 50 parts of acetone, 30 parts of trichlorethyl phosphate, 10 parts of triphenyl phosphate, 0.3 part of disodium phthalate and any colouring matter desired, for example, 0.1 part of 1-amino-4-hydroxy-anthraquinone. The mixture is transferred to heated rolls and worked thereon until the acetone content is reduced to about 10%. The product is taken from the rolls in sheets which are stacked in a press and pressed while heated to about 100° C. until they become welded into a homogeneous block. After cooling, the block is cut into sheets say 0.01 inch thick which are then seasoned to remove acetone and finally polished by pressing warm between polished metal sheets. The presence of the disodium phthalate does not materially affect the clarity of the sheets.

The red-coloured sheets so obtained are considerably more resistant to heat and/or light, e. g. to exposure in the carbon-arc fadeometer, than are similar sheets not containing sodium phthalate.

The proportion of disodium phthalate may be reduced to one half or one quarter of that indicated without materially impairing the resistance of the product to light and heat.

Alternatively the product resulting from the working on the heated rolls may be rolled out directly into sheets and the latter seasoned and polished; this method is best suited to small scale working and in general leads to products which are less satisfactory from the point of view of appearance.

If desired the disodium phthalate and/or the colouring matter may be added to the mix while the latter is being worked on the heated rolls and wet out thereon by spraying with a little acetone to facilitate incorporation.

The 1-amino-4-hydroxy-anthraquinone may be replaced by other colouring matters or by mixtures of colouring matters for example by other amino-anthraquinones such as 1:4-diamino-anthraquinone (violet), 1-amino-4-phenylamino-anthraquinone (violet-blue), 1-hydroxyethylamino-anthraquinone (scarlet).

In place of the disodium phthalate or other alkali metal phthalate there may be used an alkali metal salt of another carboxylic acid, particularly an acid having a dissociation constant of from $1 \times 10^{-2}$ to $1 \times 10^{-4}$. The acid is preferably one in which the ratio of the number of carboxyl groups to the total number of carbon atoms is at least 1:12 or 1:8 and not more than 1:3. Such other acid may comprise a hydrocarbon residue carrying one or more carboxyl groups. The acid may be wholly aliphatic, e. g. caproic acid or caprylic acid, or it may contain an aromatic nucleus, especially a benzene nucleus. In the latter case the carboxyl group or groups may be directly attached to the aromatic nucleus as in phthalic acid, or indirectly via an aliphatic carbon atom or atoms as in phenylacetic acid.

Thus we may use the sodium or other alkali metal salts of benzoic acid, isophthalic acid, terephthalic acid, hexahydrobenzoic acid, p-toluic acid, p-methoxy-benzoic acid, alpha- or beta-naphthoic acid, salicylic acid, or phenylacetic acid. In general the alkali-metal salts of benzene carboxylic acids, their methyl and other homologues, and their hydroxy and alkoxy substitution products are particularly useful for the purposes of the invention. In the above example for instance, the weights of disodium phthalate specified may be replaced by equal weights of sodium benzoate with very satisfactory results.

The alkali-metal carboxylic acid salts other than alkali-metal salts of phthalic acid may be employed in proportions, relative to the tri-chlorethyl phosphate, similar to those indicated in the case of the alkali-metal phthalates. The proportion may thus be such that their alkali-metal contents are the same (in the case of sodium salts) or chemically equivalent (in the case of other alkali-metals) to the sodium content of the proportions of disodium phthalate recommended above.

Again the alkali metal salts may be replaced by corresponding salts of other metals for example calcium, barium, strontium, magnesium or lead. Thus strontium caprylate, or strontium caproate, or lead stearate may be used though those substances are considerably less effective than disodium phthalate.

The invention has been described more particularly in relation to compositions containing trichlorethyl phosphate. It may, however, be applied to compositions containing other chlorine-containing plasticizers, or bromine-containing plasticizers, having hydrogen attached to a carbon atom adjacent to a carbon atom carrying chlorine or bromine. Examples of such plasticizers are chlorinated waxes, beta-chlorethyl-methoxyethyl-butoxyethyl phosphate, and the chlorobutyl and chlorobutoxy-butyl esters referred to in U. S. Patent No. 2,525,961, e. g. delta-chlorobutyl acetate, delta-chlorobutoxybutyl acetate, and di-(delta-chloro-butyl) phthalate.

Again, in place of cellulose acetate, the compositions may comprise other cellulose esters of carboxylic acids or they may comprise cellulose ethers. Examples of such other esters and ethers are cellulose propionate, cellulose acetate propionate, cellulose acetate butyrate and ethyl or benzyl cellulose. Further, the cellulose acetate may be replaced by other organic thermoplastic film-forming substances compatible with the plasticizer. Among such substances are polyvinyl- and polyvinylidene compounds such as: polyvinyl chloride, polyethyl acrylate, polymethyl methacrylate, polymethyl chloracrylate, and copolymers of vinyl chloride with vinyl-acetate and of vinyl chloride and/or vinylidene chloride with acrylonitrile and/or methacrylonitrile.

Having described our invention what we desire to secure by Letters Patent is:

1. A composition of matter comprising a cellulose derivative selected from the group consisting of ethyl cellulose, benzyl cellulose and cellulose esters of alkanoic acids containing up to 4 carbon atoms, a plasticiser therefore containing halogen selected from the group consisting of chlorine and bromine, a colouring matter of which the rate of fading by light is normally accelerated by the presence of the plasticiser, and, to reduce this deleterious effect of the latter, a small proportion of an alkali metal salt of an acid selected from the group consisting of benzene carboxylic acids and their homologues, hydroxy derivatives and alkoxy derivatives.

2. Composition as set forth in claim 1 in which the cellulose derivative is a cellulose ester of an alkanoic acid having up to 4 carbon atoms.

3. Composition as set forth in claim 1 in which the cellulose derivative is cellulose acetate.

4. A light-transparent sheet of the composition of claim 1.

5. A composition of matter comprising cellulose acetate, trichlorethyl phosphate, a colouring matter of which the rate of fading by light is normally accelerated by the presence of the trichlorethyl phosphate, and, to reduce this deleterious action of the latter, from 0.1 to 2 percent of disodium phthalate based on the weight of the trichlorethyl phosphate.

6. A composition of matter comprising cellulose acetate, a chlorine-containing plasticiser therefor, a colouring matter of which the rate of fading by light is normally accelerated by the presence of the plasticiser and, to reduce this deleterious effect of the latter, a small proportion of an alkali metal salt of an acid selected from the group consisting of benzene carboxylic acids and their homologues, hydroxy derivatives and alkoxy derivatives.

7. A composition of matter comprising cellulose acetate, trichlorethyl phosphate, a colouring matter of which the rate of fading by light is normally accelerated by the presence of the plasticiser and, to reduce this deleterious effect of the latter, a small proportion of an alkali metal salt of an acid selected from the group consisting of benzene carboxylic acids and their homologues, hydroxy derivatives and alkoxy derivatives.

8. A composition of matter comprising cellulose acetate, trichlorethyl phosphate, a colouring matter of which the rate of fading by light is normally accelerated by the presence of the phosphate and, to reduce this deleterious effect of the latter, a small proportion of an alkali metal salt of an acid selected from the group consisting of benzene carboxylic acids and their homologues, hydroxy derivatives and alkoxy derivatives, the amount of the salt per 100 parts of trichlorethyl phosphate being such as contains alkali metal equivalent to from 0.022 to 0.22 part of sodium.

9. A composition of matter comprising cellulose acetate, trichlorethyl phosphate, a colouring matter of which the rate of fading by light is normally accelerated by the presence of the phosphate and, to reduce this deleterious effect of the latter, a small proportion of a sodium salt of an acid selected from the group consisting of benzene carboxylic acids and their homologues, hydroxy derivatives and alkoxy derivatives, the amount of the salt per 100 parts of trichlorethyl phosphate being such as contains from 0.022 to 0.22 part of sodium.

10. A composition of matter comprising cellulose acetate, trichlorethyl phosphate, an amino anthraquinone colouring matter of which the rate of fading by light is normally accelerated by the presence of the phosphate and, to reduce this deleterious effect of the latter, a small proportion of a sodium salt of an acid selected from the group consisting of benzene carboxylic acids and their homologues, hydroxy derivatives and alkoxy derivatives, the amount of the salt per 100 parts of trichlorethyl phosphate being such as contains from 0.022 to 0.22 part of sodium.

11. A composition of matter comprising cellulose acetate, trichlorethyl phosphate, 1-amino-4-hydroxy anthraquinone as a colouring matter therefor, and from 0.1 to 2% of disodium phthalate based on the weight of the trichloroethyl phosphate.

12. A light-transparent sheet of a composition comprising cellulose acetate, trichlorethyl phosphate, a colouring matter of which the rate of fading by light is normally accelerated by the presence of the phosphate and, to reduce this deleterious effect of the latter, a small proportion of an alkali metal salt of an acid selected from the group consisting of benzene carboxylic acids and their homologues, hydroxy derivatives and alkoxy derivatives, the amount of the salt per 100 parts of trichlorethyl phosphate being such as contains alkali metal equivalent to from 0.022 to 0.22 part of sodium.

13. A light transparent sheet of a composition comprising cellulose acetate, trichlorethyl phosphate, a colouring matter of which the rate of fading by light is normally accelerated by the presence of the trichlorethyl phosphate, and, to reduce this deleterious action of the latter, from 0.1 to 2% of disodium phthalate based on the weight of the trichlorethyl phosphate.

14. A light-transparent sheet of a composition comprising cellulose acetate, trichlorethyl phosphate, 1-amino-4-hydroxy anthraquinone and from 0.1 to 2% of disodium phthalate based on the weight of the trichlorethyl phosphate.

References Cited in the file of this patent

UNITED STATES PATENTS

| | | |
|---|---|---|
| 1,742,507 | Henning | Jan. 7, 1930 |
| 1,965,608 | Salzberg | July 10, 1934 |
| 2,525,961 | Shugar | Oct. 17, 1950 |
| 2,618,568 | Meyer | Nov. 18, 1952 |